(12) United States Patent
Martin et al.

(10) Patent No.: US 8,387,398 B2
(45) Date of Patent: Mar. 5, 2013

(54) APPARATUS AND METHOD FOR CONTROLLING THE SECONDARY INJECTION OF FUEL

(75) Inventors: Scott M. Martin, Titusville, FL (US); Weidong Cai, Oviedo, FL (US); Arthur J. Harris, Jr., Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 912 days.

(21) Appl. No.: 12/194,611

(22) Filed: Aug. 20, 2008

(65) Prior Publication Data
US 2009/0084082 A1 Apr. 2, 2009

Related U.S. Application Data

(60) Provisional application No. 60/972,405, filed on Sep. 14, 2007, provisional application No. 60/972,395, filed on Sep. 14, 2007.

(51) Int. Cl.
*F02C 1/00* (2006.01)

(52) U.S. Cl. ............................................ 60/772; 60/733

(58) Field of Classification Search .................... 60/723, 60/733, 736, 737, 739, 740, 746, 747, 776, 60/805, 772
See application file for complete search history.

(56) References Cited

U.S. PATENT DOCUMENTS

| | | | |
|---|---|---|---|
| 3,055,179 A | 3/1959 | Lefebvre et al. | |
| 2,979,899 A | 4/1961 | Salmon et al. | |
| 3,099,134 A | 7/1963 | Calder et al. | |
| 3,872,664 A | 3/1975 | Lohmann et al. | |
| 3,934,409 A | 1/1976 | Quillevere et al. | |
| 4,028,888 A | 6/1977 | Pilarczyk | |
| 4,192,139 A | 3/1980 | Buchheim | |
| 4,265,615 A | 5/1981 | Lohmann et al. | |
| 4,420,929 A | 12/1983 | Jorgensen et al. | |
| 4,499,735 A | 2/1985 | Moore et al. | |
| 4,590,769 A | 5/1986 | Lohmann et al. | |
| 4,731,989 A * | 3/1988 | Furuya et al. | 60/775 |
| 4,928,481 A | 5/1990 | Joshi et al. | |
| 5,394,688 A | 3/1995 | Amos | |
| 5,408,825 A | 4/1995 | Foss et al. | |
| 5,479,782 A | 1/1996 | Parker et al. | |
| 5,623,819 A | 4/1997 | Bowker et al. | |
| 5,640,851 A | 6/1997 | Toon et al. | |
| 5,647,215 A | 7/1997 | Sharifi et al. | |
| 5,657,632 A | 8/1997 | Foss | |
| 5,687,571 A | 11/1997 | Althaus et al. | |
| 5,749,219 A | 5/1998 | DuBell | |
| 5,802,854 A | 9/1998 | Maeda et al. | |
| 5,826,429 A | 10/1998 | Beebe et al. | |
| 5,850,731 A | 12/1998 | Beebe et al. | |
| 5,924,858 A * | 7/1999 | Tuson et al. | 431/10 |

(Continued)

FOREIGN PATENT DOCUMENTS

| JP | 61022127 A | 1/1986 |
|---|---|---|
| JP | 07041255 A | 2/1995 |

(Continued)

*Primary Examiner* — Phutthiwat Wongwian (57) ABSTRACT

A combustor (28) for a gas turbine engine is provided comprising a primary combustion chamber (30) for combusting a first fuel to form a combustion flow stream (50) and a transition piece (32) located downstream from the primary combustion chamber (30). The transition piece (32) comprises a plurality of injectors (66) located around a circumference of the transition piece (32) for injecting a second fuel into the combustion flow stream (50). The injectors (66) are effective to create a radial temperature profile (74) at an exit (58) of the transition piece (32) having a reduced coefficient of variation relative to a radial temperature profile (64) at an inlet (54) of the transition piece (32). Methods for controlling the temperature profile of a secondary injection are also provided.

13 Claims, 6 Drawing Sheets

U.S. PATENT DOCUMENTS

| | | |
|---|---|---|
| 6,047,550 A | 4/2000 | Beebe |
| 6,092,363 A | 7/2000 | Ryan |
| 6,192,688 B1 | 2/2001 | Beebe |
| 6,418,725 B1 | 7/2002 | Maeda et al. |
| 6,513,334 B2 | 2/2003 | Varney |
| 6,868,676 B1 * | 3/2005 | Haynes ............... 60/776 |
| 7,082,770 B2 | 8/2006 | Martlling et al. |
| 7,198,483 B2 | 4/2007 | Bueche et al. |
| 7,302,801 B2 | 12/2007 | Chen |
| 7,303,388 B2 | 12/2007 | Joshi et al. |
| 7,886,545 B2 * | 2/2011 | Lacy et al. ............ 60/804 |
| 2001/0049932 A1 | 12/2001 | Beebe |
| 2003/0024234 A1 | 2/2003 | Holm et al. |
| 2005/0229604 A1 | 10/2005 | Chen |
| 2007/0089419 A1 * | 4/2007 | Matsumoto et al. ........... 60/737 |
| 2007/0234733 A1 | 10/2007 | Harris et al. |

FOREIGN PATENT DOCUMENTS

| | | |
|---|---|---|
| JP | 10047679 A | 2/1998 |
| JP | 10160164 A | 6/1998 |
| JP | 2004205204 A | 4/2004 |
| JP | 2007113888 A | 5/2007 |
| WO | 2005124231 A2 | 12/2005 |

* cited by examiner

APPARATUS AND METHOD FOR CONTROLLING THE SECONDARY INJECTION OF FUEL

This application claims benefit under 35 USC 119(e)(1) of the Sep. 14, 2007 filing date of U.S. Provisional Application Nos. 60/972,405 and 60/972,395, the entirety of each of which are incorporated by reference herein.

STATEMENT REGARDING FEDERALLY SPONSORED DEVELOPMENT

Development for this invention was supported in part by Contract No. DE-FC26-05NT42644, awarded by the United States Department of Energy. Accordingly, the United States Government may have certain rights in this invention.

FIELD OF THE INVENTION

The present invention relates to an apparatus and method for operating a gas turbine engine, and more particularly to an apparatus and a method for controlling the secondary injection of fuel to provide an increasingly even temperature distribution for the combustion of fuel, thereby reducing an amount of NOx, unburned hydrocarbons, and carbon monoxide in the exhaust gas traveling from the transition piece to a first set of turbine blades in a gas turbine engine.

BACKGROUND OF THE INVENTION

Figure 1:
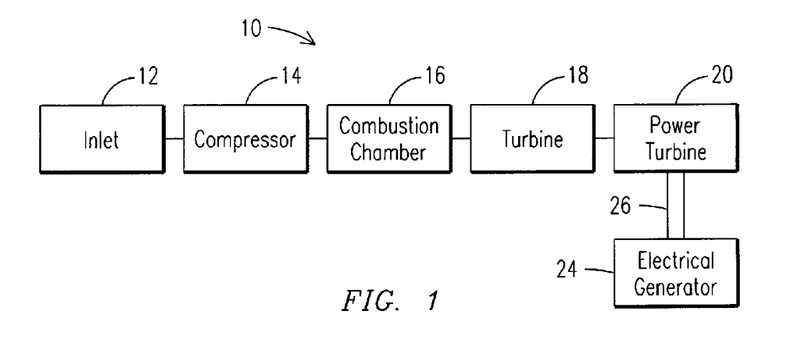
FIG. 1 is a schematic of a conventional combustion system known in the art.

Known gas turbines include a compressor section, a combustion section and a turbine section. For example, Prior Art FIG. 1 depicts a typical industrial gas turbine engine 10 comprising in axial flow series: an inlet 12, a compressor section 14, a combustion section 16, a turbine section 18, a power turbine section 20 and an exhaust 22. The compressor section 14 is driven by the turbine section 18 through a common shaft connection. The combustion section 16 typically includes a circular array of a plurality of circumferentially spaced combustors. A fuel or fuel mixture is burned in each combustor to produce a hot energetic flow of gas, which flows through a transition piece for flowing the gas to the turbine blades of the turbine section.

The primary air pollutants produced by gas turbines are oxides of nitrogen, carbon monoxide and unburned hydrocarbons. For many years now, the typical combustor has included a primary injection system at a front end thereof to introduce fuel into the combustion chamber along with compressed air from compressor section 14. Typically, the fuel and air are premixed and then introduced into an igniter to produce a flowing combustion stream that travels along a length of the combustion chamber and through the transition piece to the first row of turbine blades. One challenge in such single site injection systems is there is always a balance to be obtained between the combustion temperature and the efficiency of the combustor. While high temperatures generally provide greater combustion efficiency, the high temperatures also produce higher levels of NOx. Moreover, the combustion of the primary fuel typically forms a flame having a temperature profile in the combustion chamber and transition piece that has a relatively hot core temperature and cooler peripheral zones. In these cooler peripheral zones, efficiency of combustion is typically less than that of a hotter central zone. The hot core temperature typically has increased levels of NOx due to the high temperatures therein. Further, within the cooler peripheral areas, there may be found increased levels of carbon monoxide and unburned hydrocarbons due to the suboptimal combustion temperature.

More recently, combustors have been developed that also introduce a secondary fuel into the combustor. For example, U.S. Pat. Nos. 6,047,550, 6,192,688, 6,418,725, and 6,868,676, all disclose secondary fuel injection systems for introducing a secondary air/fuel mixture downstream from a primary injection source into the compressed air stream traveling down a length of the combustor. While the introduction of the fuel at a later point in the combustion process appears to be able to reduce at least some NOx levels due to the short residence time of the added fuel in the transition piece and by maintaining a lower combustion temperature by adding less fuel at the head end, there still remains a hotter central zone and cooler peripheral zones in the combustion chamber and transition piece. The cooler peripheral areas have decreased combustion efficiency and increased levels of carbon monoxide and unburned hydrocarbons. Further, raising the temperature of the cooler peripheral regions to an optimal temperature for combustion necessarily requires increasing the temperature of the hotter central region to a temperature that likely produces higher NOx levels.

BRIEF DESCRIPTION OF THE DRAWINGS

The invention is explained in the following description in view of the drawings that show.

DETAILED DESCRIPTION OF THE INVENTION

In accordance with one aspect of the present invention, the inventors of the present invention have developed novel apparatus and methods for reducing levels of NOx, carbon monoxide and unburned hydrocarbons in exhaust gases while increasing the efficiency of combustors. The apparatus and methods of the present invention inject a first fuel into a compressed air stream flowing through the primary combustion chamber and through the transition piece to create a combustion stream having a radial temperature profile at an inlet of the transition piece. In one aspect of the present invention, there is provided apparatus and methods for differentially injecting a second fuel into the combustion stream within the transition piece. By injecting the second fuel in accordance with the present invention in the transition piece, combustion is evened out and the temperature profile of the combustion stream is smoothed prior to an end of the transition piece. In addition, levels of NOx, carbon monoxide and unburned hydrocarbons in the exhaust gas from the transition piece are substantially reduced relative to prior art combustors. In one aspect, the uniform temperature profile enables the combustor's combustion temperature to be reduced due to the increase in temperature in the cooler peripheral regions, thereby producing less NOx. In another aspect, due to the increased temperature in the cooler peripheral regions, injected secondary fuel may be burned more efficiently resulting in lower levels of carbon monoxide and unburned hydrocarbons.

Figure 2:
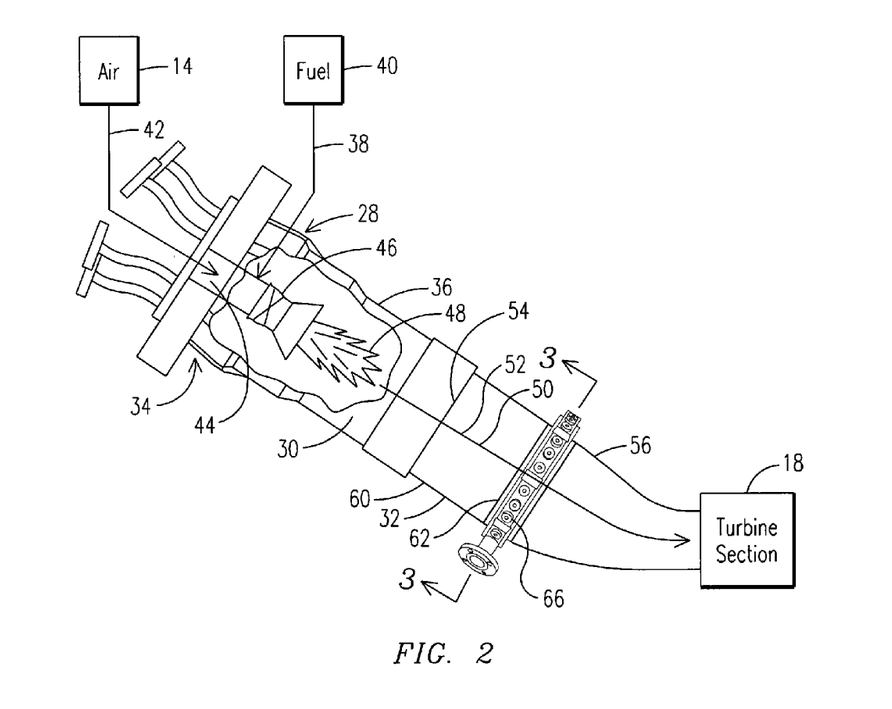
FIG. 2 is a cross-sectional view of a multi-stage axial combustor system in accordance with one aspect of the present invention.

Now referring to the drawings, FIG. 2 depicts a combustor 28 of the combustion section 16 comprising a primary combustion chamber 30 and a transition piece 32. The primary combustion chamber 30 is disposed at a front end 34 of combustor 28 and defines primary combustion zone 36. Typically, primary combustion chamber 30 includes at least one fuel line 38 that provides a first fuel to the primary combustion chamber 30 from a first fuel source 40 and at least one air supply that provides air, such as the compressor section 14, to form a compressed air stream 42. In one embodiment, the fuel and air may be fed to a mixer (not shown) for mixing fuel and air provided by the fuel and air supply lines. The mixer mixes the air and fuel so as to provide a pre-mixed fuel air supply that travels through a passageway 44. In another embodiment, the mixer comprises a swirling vane 46 that provides the mixed fuel and air with an annular momentum as it travels through the passageway 44. In another embodiment, the compressed air stream 42 is moved through the swirling vane 46 independent of the fuel to impart rotation to the entering air and the air and fuel are thereafter mixed. Downstream from the swirling vane 46, the fuel/air mixture is ignited with the aid of a pilot flame 48, and optionally any secondary igniters, to produce a combustion stream 50. At least a portion of the resulting combustion stream 50 travels substantially along a central axis 52 of the combustor 28 to an inlet 54 of the transition piece 32, and thereafter to an outlet 58 of the transition piece 32.

As shown in FIG. 2, disposed downstream of the primary combustion chamber 30 is the transition piece 32 defining a secondary combustion zone 56 therein and having the inlet 54, the outlet 58, and a peripheral wall 60. The peripheral wall 60 of the transition piece 32 may be of any suitable shape for directing hot gas toward turbine nozzles and the first row of turbine blades of the turbine section 18 in an industrial gas system. In one embodiment, the transition piece 32 may include non-cylindrical shape as set forth in U.S. Published Patent Application No. 2003/016776, for example. In another embodiment, the transition piece 26 may have a relatively cylindrical shape and the outlet 58 of the transition piece 32 may have a smaller inner diameter than an inner diameter of the inlet 54 of the transition piece 32. The transition piece 32 may be securely attached to the primary combustion chamber 30 via any suitable structure, such as spring clips, that are well known in the art.

Figure 3:
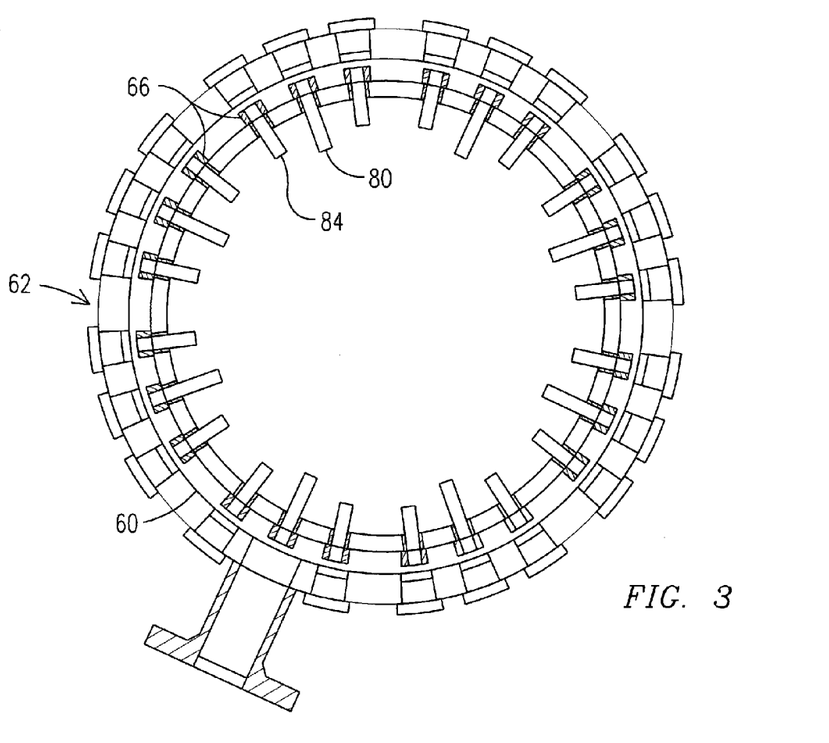
FIG. 3 is a cross-sectional view of a manifold in accordance with one aspect of the present invention taken at line A-A of FIG. 2.

In prior art combustion chambers, the transition piece of the combustion chamber simply flowed hot gases to the turbine nozzles and the first row of turbine blades in an industrial gas system. Conversely, in the present invention, as shown, the combustor 28 comprises a transition piece 32 having a secondary injection system for introducing a second fuel into the secondary combustion zone 56 of the transition piece 32. In one embodiment, as shown in FIG. 3, the secondary injection system comprises a manifold 62 located at an axial position on the transition piece 32 that supplies a second fuel to a plurality of secondary injectors 66 that are spaced circumferentially around a circumference of the peripheral wall 60 of the transition piece 32. Alternatively, fuel may be provided to the plurality of secondary injectors 66 by more than one manifold or by individual fuel delivery lines. In one embodiment, the second fuel is mixed with one or more additional components or diluents as set forth below prior to the injection of the second fuel. The second fuel injected by the secondary injectors 66 penetrates the oncoming combustion stream 50 where the secondary fuel is combusted in the secondary combustion zone 56 before exiting the transition piece 32 and entering the first row of turbine blades of the turbine section 18. Importantly, once the second fuel enters the first row of turbine blades of the turbine section 18, the gases of combustion stream 50 are allowed to expand and the temperature of the system is reduced. Thus, as a result, NOx emissions will not likely be produced after the combustion stream exits the transition piece 32.

Figure 4:
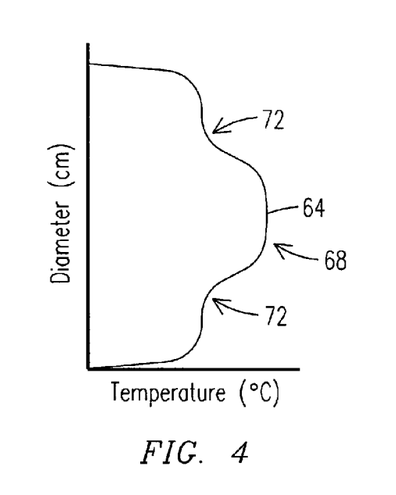
FIG. 4 is a graph showing a radial temperature profile of a typical combustion stream at an inlet of the transition piece.
Figure 5:
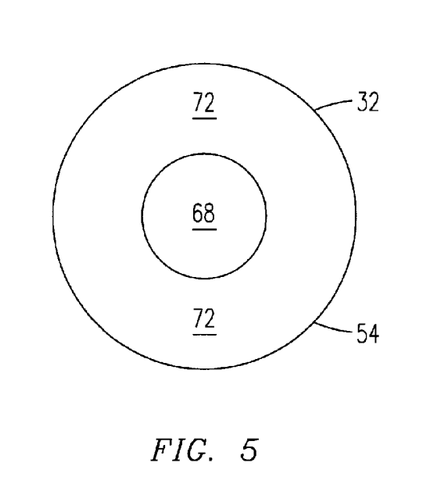
FIG. 5 is a cross-sectional view of a typical combustion stream at an inlet of the transition piece showing a central zone and cooler peripheral zones.

As the combustion stream 50 travels through the primary combustion zone 36 to the inlet 54 of the transition piece 32, the combustion stream 50 generally has a first radial temperature profile 64 as depicted in FIG. 4 at the inlet 54 of the transition piece 32. In an embodiment, the radial temperature profile 64 includes at least a hotter region at a central region 68 of the combustion stream 50 and relatively cooler regions 72 located radially outward from or at a periphery of the central region 68. By the relative terms "hotter" and "cooler," it is meant that the central region 68 may have a greater maximum temperature, a greater minimum temperature, and/or a greater average temperature than a maximum temperature, a minimum temperature, or an average temperature of a region located radially outward from or at a periphery of the central region 68, i.e. cooler regions 72. FIG. 5 is another cross-sectional view of the combustion stream 50 at the inlet 54 of the transition piece 32 having the same regions. Each of FIGS. 4-5 depict an average temperature profile of the combustion stream 50 across the inlet 54 of the transition piece 32. As can be seen, the central region 68 has a higher average temperature than cooler peripheral regions 72. In this way, the central region 68 will typically have a lower amount of carbon monoxide and unburned hydrocarbons than cooler peripheral regions 72 because of the relatively high combustion temperature. However, the central region 68 may have higher NOx levels due to the increased flame temperature.

As is also shown in FIG. 4, first radial temperature profile 64 defines a particular coefficient of variance (CV). The coefficient of variance for a data set, i.e. combustion temperatures, is a measure of the degree to which data is spread out relative to the mean or "spreadoutness of the data," i.e. temperatures. A large CV is indicative of data that is relatively spread out around the mean while a small CV is indicative of data that is concentrated closely around the mean. Thus, in one embodiment, where the average temperature is determined across a cross-section of the inlet 54 of the transition piece 32 during combustion, the CV or spreadoutness of the data may be determined according to the formula. $CV=\sigma/\mu$.

Figure 6:
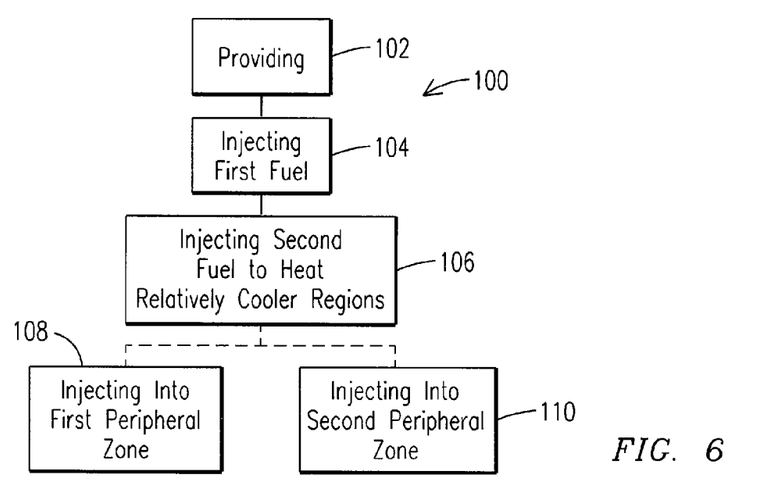
FIG. 6 is a schematic of a method for controlling combustion in a gas turbine engine in accordance with the present invention.

FIG. 6 depicts an embodiment of a method 100 for controlling combustion in a gas turbine engine that is effective to reduce a coefficient of variance of the first radial temperature profile 64 of the combustion stream 50 at the inlet 54 of the transition piece 32 prior to the exit 58 of the transition piece 32. In step 102, the method comprises providing the primary combustion chamber 30 and the transition piece 32 located downstream from the primary combustion chamber 30. In step 104, a first fuel is injected into a compressed air stream 42 flowing through the primary combustion chamber 30. The resulting compressed air stream or combustion stream 50 has a first radial temperature profile 64 at an inlet 54 of the transition piece 32 across the combustion stream 50. The first temperature profile 64 has the hotter central region 68 and relatively cooler regions 72 about a periphery of hotter central region 68. At step 106, a second fuel is preferentially injected into the relatively cooler regions 72 of compressed air stream 50 within the transition piece 32. In step 106, the combustion of the second fuel preferentially heats the relatively cooler regions 72 of the compressed air stream (the combustion stream 50) and is effective to provide a second radial temperature profile 74 at or prior to the exit 58 of the transition piece 32 having a reduced coefficient of variation relative to the first radial temperature profile 64 at the inlet 54.

Figure 7A:
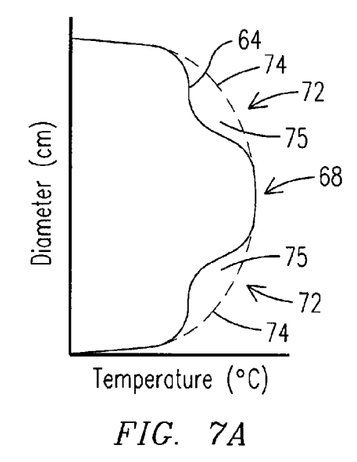
FIG. 7A is a graph showing the change to the radial temperature profile of FIG. 4 after combustion of the secondary fuel according to one aspect of the present invention.

The reduction in the coefficient of variation of the first temperature can be easily understood by reference to FIG. 7A. FIG. 7A illustrates the change in the radial temperature profile of the first radial temperature profile 64 of FIG. 4 by the combustion of a second fuel in the cooler peripheral regions 72. The increase in temperature, depicted by reference number 75, in the cooler peripheral regions 72 alters the radial temperature profile of the combustion stream 50 at the inlet 54. In particularly, by combusting fuel in the cooler peripheral regions 72, the temperature in the cooler peripheral regions 72 is increased so as to smooth the overall temperature profile of the combustion stream and produce a second radial temperature profile 74. The second radial temperature profile 74 is the radial temperature profile of the combustion stream 50 after combustion of the second fuel in the cooler peripheral regions 72 taken at a cross-section of the transition piece 32 at or prior to the outlet 58 of the transition piece 32. The second radial temperature profile 74 includes the increase in temperature in the cooler peripheral regions 72.

Figure 7B:
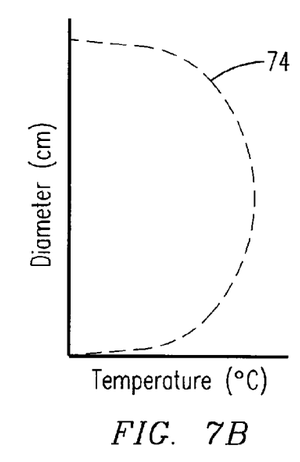
FIG. 7B is another graph showing the radial temperature profile of the combustion stream after combustion of the secondary fuel.

FIG. 7B is another view showing more clearly the shape of the resulting second radial temperature profile 74. As shown, the coefficient of variation of the second radial temperature profile 74 is less than the coefficient of variation of the first radial temperature profile 64 shown in FIG. 4. The increasingly uniform temperature profile enables the overall combustion temperature in the transition piece 32 to be lowered because of the increase in temperature in the cooler peripheral regions 72 and the elimination of hot zones in the combustion stream, thereby reducing NOx levels. Further, by raising the temperature in the cooler peripheral regions 72, levels of carbon monoxide, and unburned hydrocarbon levels resulting from incomplete combustion can be reduced due to the increased temperatures in those regions.

Figure 8:
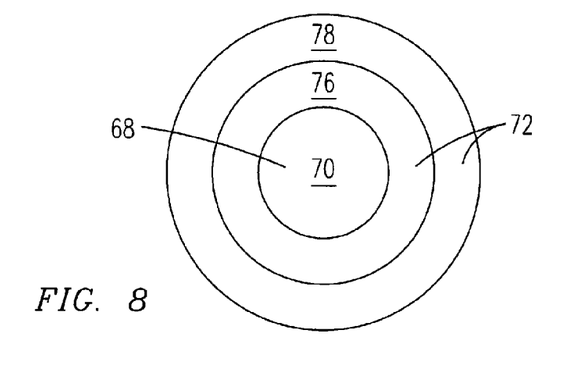
FIG. 8 is a cross-sectional view of a typical combustion stream at an inlet of the transition piece showing a central zone and multiple cooler peripheral zones.

In another embodiment, the central region 68 of the combustion stream 50 defines a central zone 70 and the cooler peripheral regions 72 define at least a first peripheral zone 76 and a second peripheral zone 78. For ease of reference, FIG. 8 depicts a cross-section of the inlet 54 of the transition piece 32 having the central zone 70, the first peripheral zone 76, and the second peripheral zone 78 in the form of annular zones, which appear as annular rings, one inside the other as shown. It is contemplated, however, that the zones may not have a predefined or regular shape and that a combustor and transition piece in accordance with the present invention may include any number of peripheral zones, each of which define a zone with a minimum, maximum and/or average temperature. In addition, it is understood that adjacent zones may include at least some degree of overlap. For purposes of explanation herein of this embodiment, the combustion stream 50 includes the central zone 70, the first peripheral zone 76, and the second peripheral zone 78, each having its own minimum, maximum, and/or average temperature within transition piece 32, which may be different from or equal to an adjacent zone. The first peripheral zone 76 is located radially or peripherally outward from the central zone 70 while the second peripheral zone 78 is located radially or peripherally outward from the first peripheral zone 76.

Figures 9, 10:
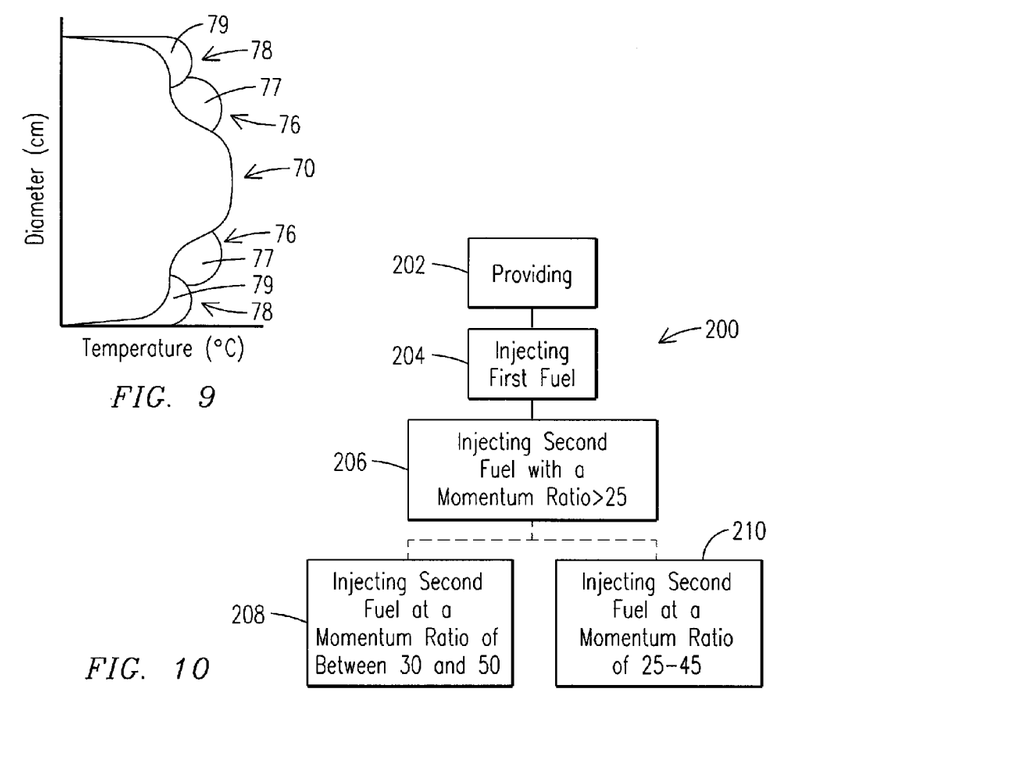
FIG. 9 is another graph showing the change in the radial temperature profile of FIG. 4 after combustion of the secondary fuel according to one aspect of the present invention.
FIG. 10 is a schematic of another method for controlling combustion in a gas turbine engine in accordance with the present invention.

In an embodiment, as shown in FIG. 6, step 106 optionally even out combustion and smoothes the first radial temperature profile 64 shown originally in FIG. 4 at the inlet of the transition piece 32 by steps 108 and 110. Step 108 comprises injecting a first amount of the second fuel into the first peripheral zone 76 effective to increase an average temperature of a portion of the compressed air stream (combustion stream 50) in the first peripheral zone 76 by a first amount. Step 110 comprises injecting a second amount of the second fuel into the second peripheral zone 78 effective to increase an average temperature of a portion of the compressed air stream (combustion stream 50) in the second peripheral zone 78 by a second amount different than the first amount. In this way, as shown in FIG. 9, when the second fuel is injected into the first peripheral zone 76 and the second peripheral zone 78, the second fuel is combusted prior to or at an end of the transition piece 32, a coefficient of variance of the first temperature profile 64 may be reduced due to the increase in the average or minimum temperature in the first and second peripheral zones 76, 78 as shown by reference numerals 77, 79 as a result of combustion. In other words, when the combustion of the fuel is spread over a wider area and is relatively uniformly burned, the combustion temperature for the fuel may be lowered. The injection of the second fuel in the transition piece 32 in accordance with the present invention is thus effective to reduce average, minimum, or temperature differentials between the adjacent zones or render them substantially equivalent or equivalent to one another.

Principally, the present invention aims to control the distribution of a secondarily injected fuel unlike any multi-stage injection system or method in the art. To modify the second radial temperature profile 74 at the exit 58 of the transition piece 32 relative to the inlet 54 of the transition piece 32, the inventors contemplate that the depth to which a second fuel penetrates the combustion stream 50 traveling down the transition piece 32 may be controlled from any one of the plurality of secondary fuel injectors 66 that inject the second fuel into the combustion stream 50 traveling from the primary combustion chamber 30 through the transition piece 32. The inventors contemplate that the ability to control the depth of penetration of the injected second fuel from the secondary injectors may be controlled by a variety of methods and structures, which will be described in detail herein, such as any or one or more of varying the number and angle of injection ports in the nozzles of the secondary injectors, varying an internal diameter of the nozzles of the secondary injectors, varying an angle of secondary injection, varying the momentum at which the second fuel is injected, and varying an amount of diluent added to the secondary fuel.

First, one method of controlling the injection of secondary fuel into the various regions or peripheral zones is to differentiate the momentum at which the secondary fuel is injected from selected ones of the secondary injectors 66 into the combustion stream 50. In this way, in one embodiment, an amount of second fuel may be injected at a particular momentum ratio such that the second fuel is injected into the relatively cooler regions 72 of the combustion stream 50 which is effective to reduce a coefficient of variance of the first radial temperature profile 64 at the inlet 54 of the transition piece 32 before the combustion stream 50 exits the transition piece 32 by either increasing an average, minimum or maximum temperature in the cooler peripheral regions 72. In another embodiment, to particularly smooth the temperature profile of the combustion stream, an amount of fuel may be injected from one or more of secondary injectors 66 at a first momentum that is sufficient to penetrate the combustion stream 50 in the first peripheral zone 76, for example, but not the central zone 70, and another amount of second fuel is injected at a second momentum that is sufficient to penetrate the second peripheral zone 78, but not the first peripheral zone 76 or the central zone 70.

Figure 11:
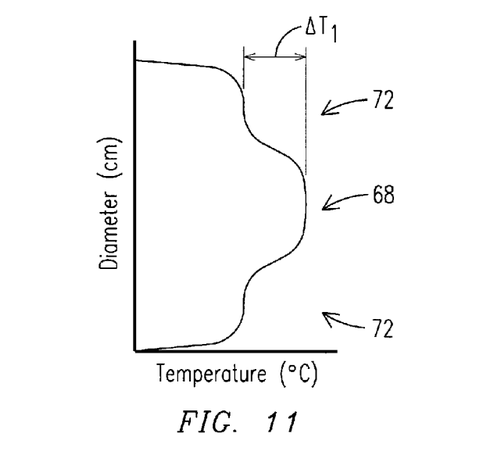
FIG. 11 is a graph showing a radial temperature profile of a typical combustion stream at an inlet of the transition piece showing a radial temperature differential between a central region and a cooler peripheral region.
Figure 12:
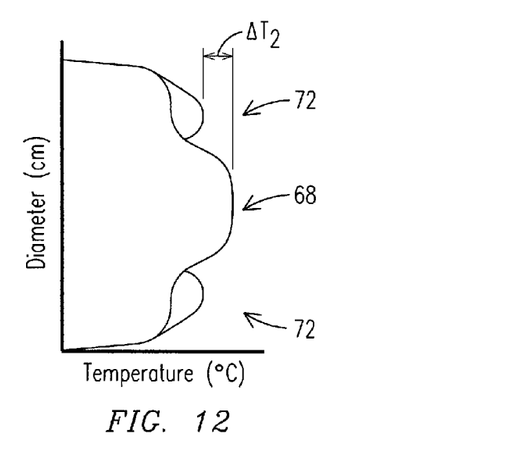
FIG. 12 is a graph showing the change in the radial temperature profile of FIG. 11 after combustion of the secondary fuel according to one aspect of the present invention.

FIG. 10 depicts a particular embodiment of a method of controlling combustion in a gas turbine engine in accordance with the present invention by controlling the location where and the momentum at which the second fuel is injected. The method 200 comprises, in step 202, providing the primary combustion chamber 30 and the transition piece 32 located downstream from the primary combustion chamber 30. In step 202, the method further comprises injecting a first fuel into the compressed air stream 42 flowing through the primary combustion chamber 30 to create a combustion stream 50 having a first momentum in an axial direction through the primary combustion chamber 30 and the transition piece 32. As shown in FIG. 11, the combustion stream 50 has a first radial temperature differential ($\Delta T_1$), which represents a differential between a minimum, a maximum or an average temperature in the hotter central region 68 and a minimum, a maximum or an average temperature in cooler peripheral regions 72 of the combustion stream 50 at the inlet 54 of the transition piece 32. In step 206, the method further comprises injecting a second fuel into the combustion stream 50 in a radial direction perpendicular to the axial direction of the flow of the combustion stream 50 within the transition piece 32 at a momentum ratio of at least about 25. As shown in FIGS. 11-12, which depicts the maximum temperatures in each region, the combustion of the second fuel is effective to reduce a radial temperature differential ($\Delta T_1$, $\Delta T_2$) of the combustion stream 50 as it flows through the transition piece 32 at a location at or prior to the exit 58 of the transition piece 32 by the combustion of the second fuel in the cooler peripheral regions 72.

The reduced temperature differential of the combustion stream 50 traveling through the transition piece 32 enables the overall combustion temperature in the transition piece 32 to be lowered because of the increase in temperature in the cooler peripheral regions 68 and the elimination of hot zones, thereby reducing NOx levels. Further, by raising the temperature in the cooler peripheral regions 72, levels of carbon monoxide and unburned hydrocarbon levels resulting from incomplete combustion in the exhaust gas can be reduced due to the increased temperatures in those regions.

In a further particular embodiment, the hotter central region 68 includes the central zone 70 and the cooler peripheral regions 72 comprise the first peripheral zone 76 located peripherally outward from the central zone 70 and the second peripheral zone 78 located peripherally outward from the first peripheral zone 76 as previously discussed above. In this embodiment, as shown in FIG. 10, step 206 described above may optionally be performed by steps 208 and 210 described below. Steps 208 and 210 allow smoothing of the first radial temperature profile 64 of the combustion stream 50 in the transition piece 32 by preferentially injecting into the first and second peripheral zones 76, 78 by controlling the depth of penetration of the second fuel.

Step 208, in particular, requires injecting a portion of the second fuel in the first peripheral zone 76 at a momentum ratio of between 30 and 50 effective to increase a minimum, a maximum, or an average temperature in the first peripheral zone 72 as the combustion stream 50 flows through transition piece 32. In step 210, the method further comprises injecting a portion of the second fuel into the second peripheral zone 78 at a momentum ratio of between 25 and 45 effective to increase a minimum, a maximum or an average temperature in the second peripheral zone 74 as combustion stream 50 flows through the transition piece 32. As previously was shown in FIG. 9, when the second fuel to the first peripheral zone 76 and the second peripheral zone 78 is combusted prior to or at an end of the transition piece 32, a coefficient of variance of the first temperature profile 64 may be reduced due to the increase in the average or minimum temperature in the first and second peripheral zones 72, 74 as shown by reference numerals 72, 74 as a result of combustion. The injection of the second fuel in the transition piece 32 in accordance with the present invention is thus effective to reduce the average, minimum or maximum temperature differentials between the adjacent zones or render them substantially equivalent or equivalent to one another.

The secondary injectors 66 may be in any suitable arrangement that provides a second radial temperature profile 74 at exit 58 of the transition piece 32 with a reduced coefficient of variation (as in methods 100 or 200) relative to the first radial temperature profile 64 or with a reduced temperature differential ($\Delta T_2$) across the combustion stream 50 relative to the temperature differential ($\Delta T_2$) across the combustion stream at the inlet 54 of the transition piece 32. In one embodiment, the secondary injectors 66 are arranged such that the second fuel is injected only into the cooler peripheral region 72. In this embodiment, a minimal amount, if any, second fuel is injected into the central region 68. Thus, when combustion of the second fuel occurs, the combustion mainly takes place in cooler peripheral regions 72, thereby increasing an average temperature, a minimum temperature, or a maximum temperature of the cooler peripheral regions 72 and resulting in a reduced coefficient of variation or a reduced temperature differential of the combustion stream 50 prior to or at exit 58 of transition piece 32. It is contemplated that it is desirable that minimal to no second fuel be injected into the hotter central region 68. However, it is understood that at least some second fuel may be delivered to and combusted within the hotter central region 68.

In accordance with one aspect of the present invention, the inventors have found that varying the structure of the nozzles of secondary injectors 66 enables control of the momentum and the depth to which the secondary fuel is injected into the traveling combustion stream 50. In one embodiment, as shown in FIG. 3, the secondary injectors 66 located within the manifold on the transition piece 32 comprise a plurality of first injectors 80 and a plurality of second injectors 82 spaced circumferentially around a perimeter of the transition piece 32. In this embodiment, the plurality of first injectors 76 are effective to inject a radial stream of a first amount of second fuel into the first peripheral zone 76 and the plurality of second injectors 82 are effective to inject a homogenized dispersion of a second amount of the second fuel into the second peripheral zone 78. As such, the first and second injectors are effective to create a differential injection depth of the second fuel into the combustion stream 50.

Figure 13:
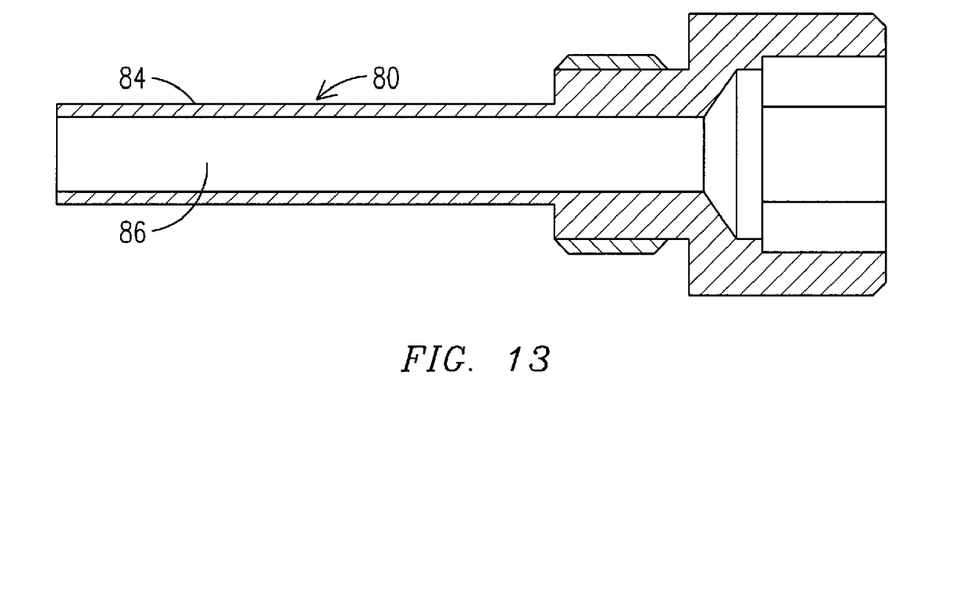
FIG. 13 is a cross-sectional view of an injector having a single-hole nozzle in accordance with the present invention.

To accomplish this differential injection depth into the combustion stream 50, in one embodiment, as shown in FIG. 13, the first injectors 80 comprise nozzles 84 having a single injection hole 86 of a predetermined diameter. The single-hole, radial injection will generally provide an injection stream having a greater injection depth than a multi-hole, homogenized dispersion. Also, by providing a single injection hole 86, the first injectors 80 are thus able to inject a portion of the secondary fuel radially further toward a center of the transition piece 32 and the central region 68. Parameters (including the momentum of injection, the addition of a diluent, etc. as described herein) may be selected such that the second fuel injected by the first injectors 78 penetrates the combustion stream 50 to the first peripheral zone 76. Preferably also, the injected fuel penetrates into the first peripheral zone 76, but does not substantially penetrate the central region 68.

Figure 14:
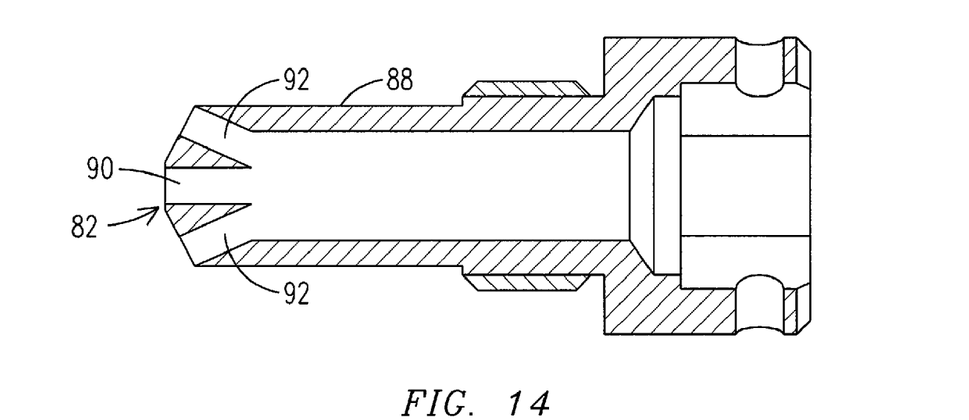
FIG. 14 is a cross-sectional view of an injector having a multiple-hole nozzle in accordance with the present invention.

Correspondingly, as shown in FIG. 14, the second injectors 82 comprise nozzles 88 having a center hole 90 through which material can be injected radially and two or more injection holes 92, angled relative to the center hole 90, which enable another portion of the second fuel to burn more towards the outer peripheral wall 60 of the transition piece 32. This effect is created because the center hole 90 and the two or more injection holes 92 produce more of a spray-like effect for injection of the second fuel compared to injection through a single radial injection hole, i.e. 90, 92, and thus will not penetrate the traveling combustion stream to the same extent as the injection stream from the first injectors 80. In this way, the fuel injected from the first injectors 80 will penetrate the combustion stream 50 closer to the central region 68 of the combustion stream 50. Conversely, secondary fuel injected from the second injectors 82 will penetrate the combustion stream 50 to a lesser degree than the first injectors 80, but will nevertheless penetrate the combustion stream 50. The first injectors 80 and the second injectors 82 collectively inject secondary fuel into at least two different zones peripherally outward from the central region 68 of the transition piece 32. In this way, the average temperature, minimum temperature, and/or maximum temperature in at least two zones disposed radially or peripherally outward from the central region 68 may be increased. In one embodiment, the injection holes 92 are angled from about 15° to about 45° from the center hole 90, and preferably about 30° from the center hole 90 as shown.

In another embodiment, the extent to which the nozzles 84 of the first injectors 80 and nozzles 88 of the secondary injectors 82 are inserted into the secondary combustion zone 56 of the transition piece 32 can be varied to control the depth to which the second fuel is injected by the first injectors 80 and the second injectors 82. In one embodiment, the nozzles 84, 88 of the first and second injectors 80, 82 respectively are similar or equivalent in length. In another embodiment, the nozzles 84 of the first injectors 80 and the nozzles 88 of the second injectors 82 are of different lengths to further aid in injecting a portion of the secondary fuel into different peripheral zones. As shown in FIG. 3, for example, the first injectors 80 and second injectors 82 are spaced circumferentially around a perimeter of manifold 62. However, the nozzles 84 of the first injectors 80 are of a length that is longer than a length of the nozzles 88 of the second injectors 82. In this way, the longer nozzles 84 extend farther into the traveling combustion stream 50 through the transition piece 32 than nozzles 88, and as a result of the radial injection described above, may inject a second fuel into the first peripheral zone 78 as set forth herein. Conversely, the relatively shorter nozzles 88 of the second injectors 82, coupled with its multi-injection hole configuration, provide more of a spray-like pattern that does not penetrate the combustion stream 50 to the same extent as the first injectors 80, and thus fuel injected from the nozzles 88 penetrate into the second peripheral zone 78, but preferentially not into the first peripheral zone 76 or the central zone 70.

The inventors have found that optimum mixing, optimum residence time, and a differing degree of injection penetration into the traveling combustion stream 50 through the transition piece 32 may be obtained when the first injectors 80 have a length of between about 28 and 38 mm, and preferably about 34 mm. In addition, the inventors have found that optimum mixing, optimum residence time, and a differing degree of injection penetration into the traveling combustion stream 50 from the first injectors 80 may be obtained when the second injectors 82 have a length of between about 16 and 28, and preferably about 24 mm.

It is also contemplated that the number of each of the first and second injectors 80, 82 is a tradeoff between improved mixing and cost. Collectively, more injectors of either type (first or second) allow the fuel to become better mixed with the hot gases already traveling down central axis of the transition piece 32. However, additional injectors may bring additional costs of production and use for the combustion chamber and manifold. In one particular embodiment which balances improved mixing and cost, at least ⅓ to ½ of the secondary injectors 66 in any of the above-described embodiments are the first injectors 80. For example, in the embodiment shown in FIG. 3, there are eight (long nozzle) first injectors 80 and sixteen (short nozzle) injectors 82. Each of the nozzles 84, 88 of the first and second injectors 80, 82 may be coated with a ceramic thermal barrier coating (TBC) on an outer surface of ends thereof that extend into the combustion stream 50 and may be internally cooled by the fuel-diluent flow in order to maintain a temperature below the limits of the material.

As would be appreciated by one of ordinary skill in the art, the penetration depth to which the first and second injectors 80, 82 inject a second fuel into the combustion stream 50 may also be controlled by varying the diameter of the nozzles 84, 88. Typically, by increasing the nozzle diameter, the second fuel may be injected at a higher momentum into the transition piece 32. However, momentum and the diameter of the fuel nozzles is a tradeoff between how much mass is injected and the velocity exiting the nozzles. For example, in one embodiment, the single radial injection hole 86 of the nozzle 84 of the first injectors 80 have an internal diameter of between about 3 and 6 mm, and preferably about 5.4 mm. Correspondingly, in an embodiment, the center hole 90 of the nozzle 88 of the second injectors 82 have an internal diameter of between about 1.5 mm and 3.0 mm, and preferably about 2.4 mm while the two angled holes have an internal diameter of between about 2.0 mm and 3.5 mm, and preferably about 2.8 mm.

Thus, while the first injectors 80 desirably inject a second fuel farther toward the central region 68 of the transition piece 32 than the second injectors 82, the internal diameter of the single central injection hole 80 of the first injectors 80 may be greater than the center hole 90 of the second injectors 82 because the mass of the secondary fuel injected through the single central injection hole 86 of the first injectors 80 is typically greater than the mass of secondary fuel being injected through the center hole 90 of the second injectors 82. This may be due to the fact that the flow of the second fuel is not being split to two or more angled holes in the first injectors 80 as is the case with the second injectors 82.

Further, the depth of penetration to which the secondary injectors 66 inject a second fuel into the traveling combustion stream 50 through the transition piece 32 may also be controlled by varying the mass of the second fuel being injected. In one embodiment, a diluent may be added to the second fuel that is injected from the first and second injectors 80, 82 into the transition piece 30. The diluent may be an inert gas, such as nitrogen, steam, or any other suitable material, and is preferably not air. Adding a diluent may alter the reaction rates so as to substantially delay ignition of the fuel (auto-ignition) and also may provide the injected second fuel stream with a greater momentum, thereby causing greater penetration into the combustion stream 50. Thus, in an embodiment, the amount of added diluent may be strategically varied for the second fuel injected from the first and second secondary injectors 80, 82 to penetrate the combustion stream 50 to different degrees as in any of the embodiments described herein, thereby injecting secondary fuel into different regions or zones of the combustion stream 50. Advantageously, it has been found that a ratio of from 2:1 to about 4:1 diluent to fuel by mass provides optimum burning of the fuel in the transition piece 32 with minimal NOx emissions. When the diluent is steam, the ratio of diluent to fuel may be about 4:1 by mass.

The above-described addition of a diluent other than air to the secondary fuel is yet another advantage of the present invention. Typically, air is mixed with fuel and injected into a combustion chamber. One problem, especially with axial injection downstream from a primary injection site, is ignition and flashback of the material being injected back into the subject injector. Generally, this phenomenon is due to the temperature of the combustion stream of which the fuel is being injected and the rapid ignition of the fuel and air mixture. In one aspect, the present invention may eliminate flashback by the introduction of a secondary fuel from secondary injectors, i.e. secondary injectors 66, in the absence of air. Instead, an amount of a diluent may be added to the second fuel as described above, which may be an inert gas, such as nitrogen, steam, or any other suitable material.

In a particular embodiment, the second fuel injected from any of secondary injectors 66 includes a minimal amount to no added air or diluent. Instead, a material consisting essentially of the second fuel is injected from either or both of the secondary injectors 66. In an embodiment, since the second fuel lacks the mass added by a diluent, the material consisting essentially of second fuel is injected as a high velocity/high momentum jet into the transition piece 32. In one embodiment, for example, the injection holes 86, 90, 92 of the nozzles 84, 88 of the first and/or second injectors 80, 82 may further include a relatively small cross-sectional internal diameter to provide an injection stream having a very high momentum ratio, i.e. greater than 50. It is contemplated that the momentum at which the first and second injectors inject fuel without a diluent can be varied so as to introduce the fuel into the cooler peripheral regions as described herein. In this way, the second fuel (without a diluent) may be differentially injected into two or more regions or zones in the transition piece as described herein to reduce a coefficient of variation of a first radial temperature profile taken at the inlet of the combustion stream or to reduce a radial temperature differential taken at the inlet of the transition piece.

Further, the momentum and depth of penetration to which the secondary injectors 66 inject secondary fuel into the traveling combustion stream 50 may also be controlled by varying the pressure at which the second fuel is injected. For example, in one embodiment, the pressure at which the second fuel is injected can be increased or decreased by increasing the pressure at which the fuel and/or any diluent is fed to the secondary injectors 66 and by varying an internal diameter of the nozzles 84, 88 of the injectors as described above, or by any other suitable method known in the art.

Figure 15:
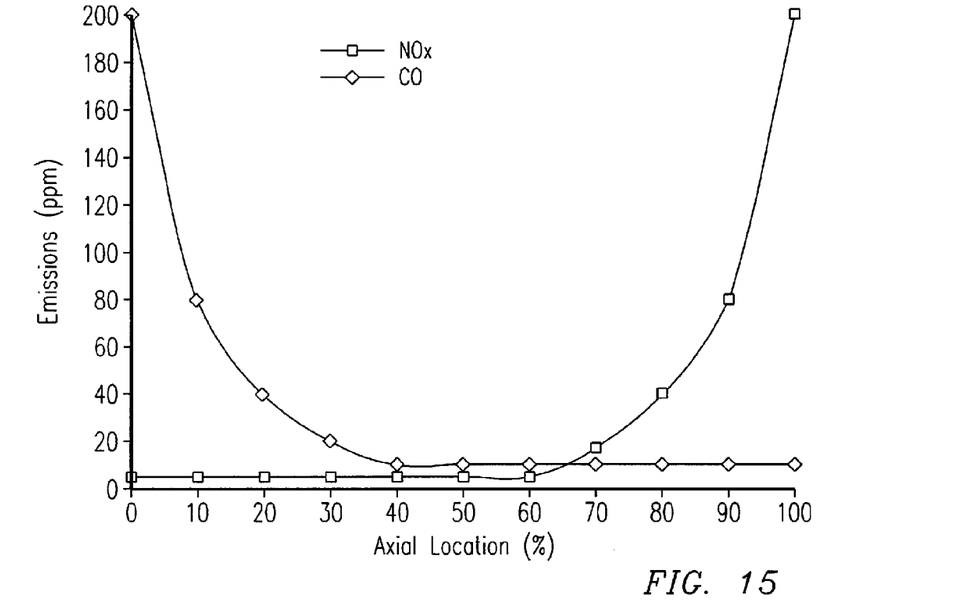
FIG. 15 is a graph showing expected levels of NOx, carbon monoxide, unburned hydrocarbons and free radials from the combustion of a second fuel in the transition piece in accordance with the present invention.

Ideally, in the embodiments described herein, the inventors have recognized that it is particularly desirable to control the parameters around the secondary injection such that combustion of the second fuel is completed as close to a downstream end of the transition piece 32 as possible. Moreover, the inventors have recognized it is desirable for the combustion to be completed at a point where the NOx, CO, and unburned hydrocarbon emissions are at their collective minimum. As shown in FIG. 15, from computer modeling, the expected concentrations of NOx and CO emissions are plotted against the axial location on the transition piece 32 by percentage of the axial location along the length of the transition piece. In an embodiment of the present invention, the burning of the secondary fuel is injected at a point along an axial length of the transition piece such that the combustion of the second fuel is completed at a point prior to or at the outlet 58 end of the transition piece 32 and the NOx, unburned hydrocarbon, and carbon monoxide levels resulting from the combustion of the secondary fuel are at or near their minimum.

Specifically, as can be seen by exemplary FIG. 15, the amounts of NOx and CO are at their collective minimums at between about 25% and 75% of the axial length of the transition piece 32. Note the concentration of unburned hydrocarbon emissions would be expected to be similar to or mirror the amounts of CO emissions shown along the transition piece. Accordingly, the inventors note that it would be particularly advantageous if the secondary fuel is injected such that the combustion stream 50 has the emission profile shown between 25% and 75% percent of the axial length of the transition piece 32. To accomplish this, the secondary injectors 66 may be positioned at a point along an axial length of the transition piece 32 such that secondary combustion is completed prior to the outlet 58 end of the transition piece 32 while having the desired emission profile shown (for example, the emission profile shown between 25% and 75% in FIG. 15). In one embodiment, therefore, the secondary injectors are located at a point from at least about 0 to 75% of an axial length of the transition piece. In another embodiment, the secondary injectors are located at a point from 25% to 75% of an axial length of the transition piece.

It is contemplated that the graph shown in FIG. 15 is merely exemplary of a set of secondary combustion emissions and that different combustion systems may have different emission profiles. However, it is understood that the present inventors advantageously recognize that the secondary injectors (or any secondary injection system) should be positioned along an axial length of the transition piece at a point where the secondary fuel injected will complete combustion at a point near or at an end of the transition piece so as to produce the least amount of NOx, CO, and unburned hydrocarbon emissions.

In one embodiment, the target distance is within 50 percent of an axial length of the transition piece. Within this target distance, the amounts of NOx, CO, and unburned hydrocarbon emissions will likely be at a minimum. In another embodiment, the target distance is within 20 percent of an axial length of the transition piece, and in yet another embodiment, within 10 percent of an axial length of the transition piece. It is understood that while it is most desirable to complete combustion just prior to an end of the transition piece, one must allow for some variation in the time required to complete the combustion of repeated secondary injections of fuel during operation. As much as it important not to complete combustion too early, it is equally important to not inject the secondary fuel such that the secondary fuel does not fully complete combustion within the transition piece 32 as NOx, CO, and unburned hydrocarbon levels may rapidly increase. Accordingly, designing the secondary combustion system to complete combustion within the target distance that is within 20 or 10 percent of the transition piece allows combustion to be completed at or near the outlet end of the transition piece while allowing for some variability.

Figure 16:
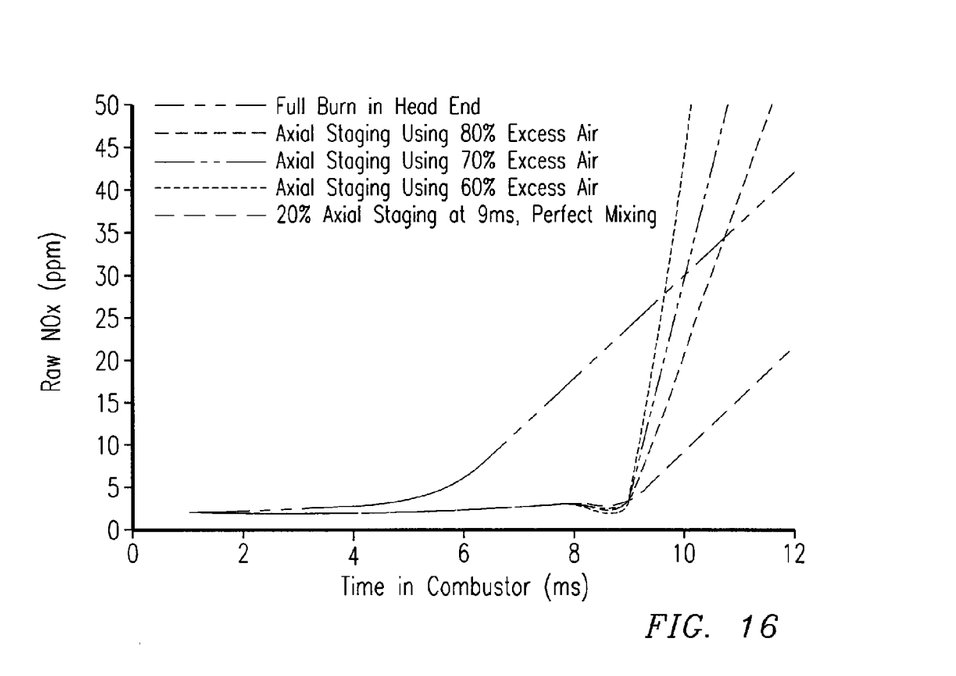
FIG. 16 is a graph comparing the differing amounts of NOx emissions as a result of full burn combustion and axial staging with different levels of mixing.

In accordance with yet another aspect of the present invention, the inventors have also surprisingly found that an axial stage design alone that injects at least a secondary fuel downstream as set forth in U.S. Pat. No. 6,418,725, for example, will not sufficiently solve the problem of reducing NOx emissions and maintaining a relatively high combustion efficiency. There must also be adequate fuel/air mixing at each axial stage of a multi-stage axial system, otherwise the amount of NOx generated can actually be greater than the NOx generated by a standard full burn in the head end system with no axial staging. As shown in FIG. 16, for example, compared to full burn in the head end of the combustion chamber, axial staging with 20% fuel at 75% of the distance through the combustion chamber and transition piece 32 (with perfect mixing) will reduce NOx emissions. But, as is also shown in FIG. 16, if air/fuel mixing is non-perfect at each axial stage, the amount of NOx generated by combustion due to poor mixing of fuel and air can actually be greater than the full burn in the head end case. Mixing may be defined as how much of the remaining air is mixed with the axial fuel. Generally, more air results in less NOx emissions. As seen, axial staging using 80%, 70%, and 60% excess air actually produced more NOx than the head end case. Thus, in one of aspect of the present invention, the present invention provides an apparatus and method that ensures optimum mixing of fuel, as well as selectively smoothing a temperature profile of a combustion stream resulting from a secondary injection of fuel.

There are a number of factors that may contribute to establishing the optimum mixing time of an injected fuel mixture. The considerations to be balanced primarily consist of providing sufficient time for mixing of the second fuel and for minimizing the residence time such that the amount of NOx emissions does not become large. To arrive at a balance of these two competing considerations, factors to consider include the number of nozzles of the injectors, the axial location of the injectors in the transition piece 32, the amount of fuel injected, the amount of diluent added to the fuel, the amount of fuel injected secondarily relative to the amount of primary fuel injected, the internal diameter of the fuel nozzles, the extent to which the nozzles of the injectors are inserted into the flow, and the momentum of the secondary fuel mixture at each nozzle exit.

The amount of fuel is a particular consideration in establishing the optimum mixing and residence time of the second fuel such that the secondary mixture burns without producing significant NOx emissions. The inventors have found that injecting from about 10 to about 30%, and in one embodiment, about 20% of the total fuel into the transition piece 32 by the secondary injectors 66 is sufficient to provide optimum mixing and residence time of the second fuel. The total fuel represents the amount of fuel injected into the combustion chamber and transition piece collectively. In this way, a sufficient, but not excessive amount of the second fuel, mixes with the hot gases of the combustion stream 50 and substantially burns at or near the outlet 58 of the transition piece 32 as set forth above, thereby minimizing NOx, carbon monoxide and unburned hydrocarbon emissions.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method for controlling combustion in a gas turbine engine, the method comprising:
providing a primary combustion chamber and a transition piece located downstream from the primary combustion chamber;
injecting a first fuel into a compressed air stream flowing through the primary combustion chamber to form a combustion stream, wherein combustion of the first fuel forms a first radial temperature profile across the combustion stream at an inlet of the transition piece; and
injecting a second fuel preferentially into a relatively cooler portion of the combustion stream within the transition piece, wherein combustion of the second fuel preferentially heats the relatively cooler portion of the air stream and is effective to provide a second radial temperature profile at an exit of the transition piece having a reduced coefficient of variation relative the first radial temperature profile at the inlet of the transition piece;
wherein the transition piece comprises at least a central zone, a first zone located peripherally outward from the central zone, and a second zone located peripherally outward from the first zone, and wherein the injecting the second fuel comprises:
preferentially injecting a first amount of the second fuel into the first zone, but not the central zone, effective to increase an average temperature of a portion of the combustion stream in the first zone by a first amount; and
preferentially injecting a second amount of the second fuel into the second zone, but not the first zone or the central zone, effective to increase an average temperature of a portion of the combustion stream in the second zone by a second amount different than the first amount.

2. The method of claim 1, wherein the injecting of second fuel into the first and second zones is done by radially injecting the second fuel from a plurality of first injectors and a plurality of second injectors located around a perimeter of the transition piece, wherein the plurality of first injectors are effective to inject the first amount of second fuel into the first zone, and wherein the plurality of second injectors are effective to inject the second amount of second fuel into the second zone.

3. The method of claim 2, wherein the plurality of first injectors are effective to inject a radial stream of the first amount of second fuel into the first zone, and wherein the plurality of second injectors are effective to inject a homogenized dispersion of the second amount of second fuel into the second zone.

4. The method of claim 3, wherein the plurality of first injectors comprise nozzles having a single center hole through which the first amount of second fuel can be injected radially and the plurality of second injectors comprise nozzles having a center hole through which a first portion of the second amount of second fuel can be injected radially and a plurality of injection holes angled relative to the center hole through which additional portions of the second amount of second fuel can be injected angularly.

5. The method of claim 4, wherein the nozzles of the plurality of first injectors comprise nozzles of a first length and the nozzles of the plurality of second injectors comprise nozzles of a second length shorter than the first length.

6. The method of claim 1, further comprising, prior to the injecting the second fuel, mixing the fuel with a diluent or combination of diluents selected from the group consisting of steam, nitrogen, carbon dioxide and an inert gas.

7. A method for controlling combustion in a gas turbine engine, the method comprising:
    providing a primary combustion chamber and a transition piece located downstream from the primary combustion chamber;
    injecting a first fuel into an air stream flowing through the primary combustion chamber to create a combustion stream having a first momentum in an axial direction through the primary combustion chamber and the transition piece and having a radial temperature differential at an inlet to the transition piece between an average temperature in a hotter central region of the combustion stream flowing at the inlet to the transition piece and an average temperature in a cooler peripheral region of the combustion stream flowing at the inlet to the transition piece; and
    injecting a second fuel into the combustion stream in a radial direction perpendicular to the axial direction within the transition piece, wherein combustion of the second fuel is effective to reduce the radial temperature differential of the combustion stream as it flows through the transition piece;
    wherein the cooler peripheral region comprises a first zone located circumferentially peripherally outward from the central region and a second zone located peripherally outward from the first zone, and wherein the injecting a second fuel comprises:
        injecting a portion of the second fuel in the first annular zone at a first momentum ratio between the injected second fuel and the combustion stream of from 30 to 50 effective to increase an average temperature in the first zone as the combustion stream flows through the transition piece; and
        injecting a portion of the second fuel in the second annular zone at a second momentum ratio between the injected second fuel and the combustion stream of from 25 to 45 effective to increase an average temperature in the second zone as the combustion stream flows through the transition piece, the second momentum ratio different from the momentum ratio.

8. A combustor for a gas turbine engine comprising:
    a primary combustion chamber for combusting a first fuel to form a combustion flow stream; and
    a transition piece located downstream from the primary combustion chamber, the transition piece comprising a plurality of injectors located around a circumference of the transition piece for injecting a second fuel into the combustion flow stream;
    wherein the injectors are configured to create a radial temperature profile at an exit of the transition piece having a reduced coefficient of variation relative to a radial temperature profile at an inlet of the transition piece;
    wherein the plurality of injectors comprise a center hole through which an amount of the fuel is injected radially and a plurality of injection holes angled relative to the center hole at an outlet end through which additional portions of the second amount of the fuel is injected angularly, the injectors are located at an axial position along the transition piece and are configured to ensure completion of the burning of the second fuel within the combustion flow stream within a target distance from a downstream outlet end of the transition piece; and
    wherein the target distance from the downstream outlet end is from 0 to 20 percent of an axial length of the transition piece; and
    wherein the injector injectors are located at a point from 25 to 75 percent along the axial length of the transition piece.

9. The combustor of claim 8, wherein the target distance is less than 10 percent of the axial length of the transition piece.

10. A transition piece for a gas turbine engine comprising a plurality of fuel injectors located between an inlet end of the transition piece and a point from 0 to 75 percent along an axial length of the transition piece from the inlet end, wherein the injectors are effective to reduce a radial temperature differential between an average temperature in a hotter central region of the combustion stream and an average temperature in a cooler peripheral region of the combustion stream as it flows through the transition piece
    wherein the plurality of injectors are located at an axial position along the transition piece and are effective to ensure completion of burning of a fuel injected by the injectors within a target distance from a downstream outlet of the transition piece, the target distance being from 0 to 20 percent of the axial length of the transition piece; and
    wherein the injectors are located at a point from 25 to 75 percent along the axial length of the transition piece
    wherein the injectors comprising first and second injectors, the first injectors comprising nozzles having a single center hole through which a first amount of the fuel is injected radially into the transition piece and the second injectors comprising nozzles having a center hole through which a first amount of the fuel is injected radially and a plurality of injection holes angled relative to the center hole through which additional portions of the second amount of the fuel can be injected angularly.

11. A combustor for a gas turbine combustion system comprising:
    a primary combustion chamber adapted for combusting a first fuel to produce a combustion stream;
    a transition piece for receiving the combustion stream from the primary combustion chamber and for combusting a second fuel, the transition piece comprising a central region, a first zone located peripherally outward from the central region, a second zone located peripherally outward from the first zone, and a plurality of injectors located around a perimeter of the transition piece for injecting the second fuel;
    wherein the plurality of injectors comprise a plurality of first injectors and a plurality of second injectors, the plurality of injectors having a center hole through which a first amount of the second fuel is injected radially and a plurality of injection holes angled relative to the center hole at an outlet end through which additional portions of the first amount of the fuel is injected angularly.

12. The combustor of claim 11, wherein the second fuel represents about 20 percent of a total amount of fuel injected into the combustor.

13. A combustor for a gas turbine engine comprising:
a primary combustion chamber for combusting a first fuel to form a combustion flow stream; and
a transition piece located downstream from the primary combustion chamber having the combustion stream flowing there through;
wherein the transition piece comprises at least a central zone, a first zone located peripherally outward from the central zone, and a second zone located peripherally outward from the first zone;
first means for injecting a first amount of the second fuel into the first zone of the transition piece, but not the central zone, the first means configured to increase an average temperature of a portion of the combustion stream in the first zone by a first amount; and
second means for preferentially injecting a second amount of the second fuel into the second zone of the transition piece, but not the first zone or the central zone, the second means configured to increase an average temperature of a portion of the combustion stream in the second zone by a second amount different than the first amount;
wherein the first and second means for injecting are configured to create a radial temperature profile at an outlet of the transition piece having a reduced coefficient of variation relative to a radial temperature profile at an inlet of the transition piece.

* * * * *